(12) United States Patent
Kaiki

(10) Patent No.: US 8,279,986 B2
(45) Date of Patent: Oct. 2, 2012

(54) DIGITAL RECEIVER, CONTROLLING METHOD OF THE APPARATUS, COMPUTER PROGRAM PRODUCT, AND RECORDING MEDIUM RECORDING THEREON THE PRODUCT

(75) Inventor: Nobuyoshi Kaiki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 752 days.

(21) Appl. No.: 12/393,747

(22) Filed: Feb. 26, 2009

(65) Prior Publication Data

US 2010/0091918 A1 Apr. 15, 2010

(30) Foreign Application Priority Data

Oct. 8, 2008 (JP) ................... 2008-261921

(51) Int. Cl.
*H04B 1/10* (2006.01)
(52) U.S. Cl. ........ 375/350; 375/260; 375/262; 375/316; 375/324; 375/340; 375/341; 375/346; 375/354; 455/63.1; 455/67.13; 455/114.2; 455/296; 455/501; 455/502; 370/335; 370/342; 370/503; 370/508; 370/509; 370/510; 370/511; 370/512; 370/513; 370/514; 714/794; 714/795; 714/796; 327/141; 327/551; 341/173; 341/180
(58) Field of Classification Search .................. 375/260, 375/262, 316, 324, 340, 341, 346, 350, 354; 455/63.1, 67.13, 114.2, 296, 501, 502; 370/335, 370/342, 503, 508, 509, 510, 511, 512, 513, 370/514; 714/794, 795, 796; 327/141, 551; 341/173, 180

See application file for complete search history.

(56) References Cited

U.S. PATENT DOCUMENTS

| | | | |
|---|---|---|---|
| 6,498,926 B1 | 12/2002 | Ciccarelli et al. | |
| 7,983,329 B2 * | 7/2011 | Okada ........................ | 375/219 |
| 2005/0058232 A1 * | 3/2005 | Murakami et al. ............ | 375/350 |
| 2007/0275680 A1 * | 11/2007 | Kaiki et al. ................ | 455/184.1 |

FOREIGN PATENT DOCUMENTS

| | | |
|---|---|---|
| CN | 1317178 A | 10/2001 |
| JP | 2001-526485 A | 12/2001 |
| JP | 2007-259007 A | 10/2007 |
| WO | WO-99/30426 A1 | 6/1999 |
| WO | WO 00/14905 A1 | 3/2000 |

\* cited by examiner

*Primary Examiner* — Leon Flores
(74) *Attorney, Agent, or Firm* — Birch, Stewart, Kolasch & Birch, LLP

(57) ABSTRACT

Provided are: plural circuit components including a circuit component which constitutes a receiving unit receiving a signal sequence which is arranged so that a desired signal and a signal different from the desired signal are lined up in time series, the desired signal indicating desired data which includes at least one of text data, sound data, image data, and a computer program product; and an operating parameter changing unit which changes an operating parameter of at least one of the plural circuit components, during a period in which the receiving unit receives the signal different from the desired signal.

18 Claims, 9 Drawing Sheets

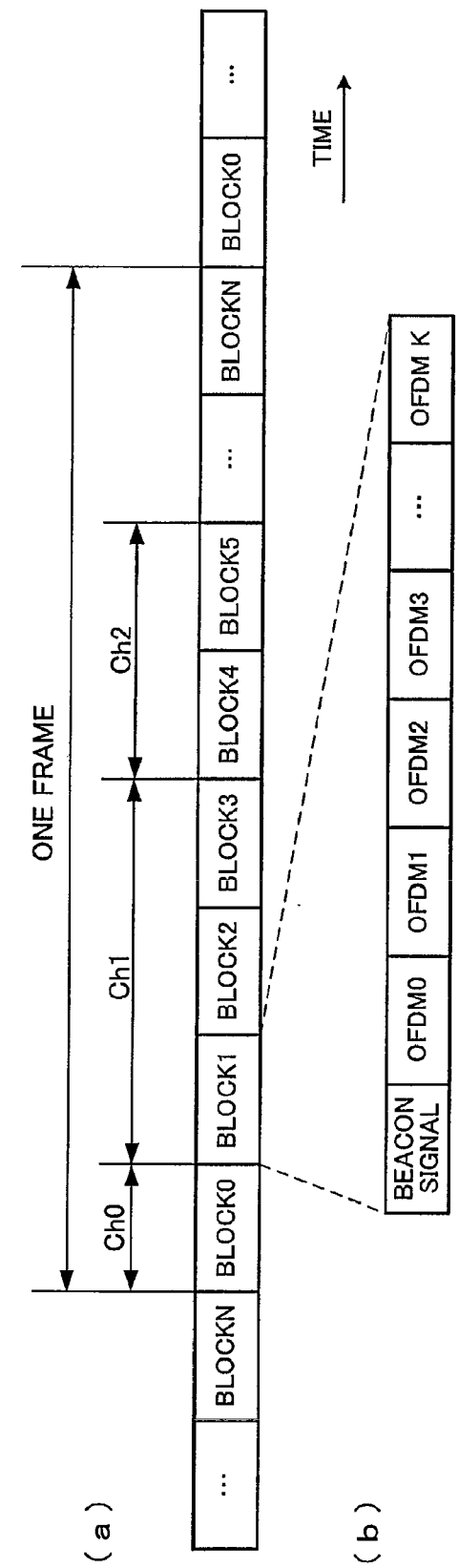

DIGITAL RECEIVER, CONTROLLING METHOD OF THE APPARATUS, COMPUTER PROGRAM PRODUCT, AND RECORDING MEDIUM RECORDING THEREON THE PRODUCT

BACKGROUND OF THE INVENTION

1. Field of the Invention

The present invention relates to a digital receiver, a controlling method of the apparatus, a computer program product, and a recording medium recording thereon the product.

2. Description of the Related Art

In a digital receiver receiving a signal indicating for example audio data, an operating parameter of a circuit component which is a part of the apparatus may be changed. Published Japanese Translation No. 2001-526485 of the PCT International Publication discloses an example of such a case, and a bias current is changed as an operating parameter. According to the publication, a non-linear component of an output signal from a demodulator demodulating a signal is measured and a bias current of each amplifier stage is controlled based on the result of the measurement.

When an operating parameter such as a bias current of a circuit component is changed as in the example above, the property of the circuit component is changed and this may influence on the operation to receive a signal. For example, a change in the bias current alters the linearity of the circuit component, and this may make it impossible to properly receive an output signal if the non-linear component in the signal is large.

According to Published Japanese Translation No. 2001-526485 of the PCT International Publication, the non-linear component in the output signal is measured and the bias current is controlled in accordance with the result of the measurement. However, when the linearity of the circuit component is altered by changing the bias current, the non-linear component of the output signal from the circuit component may be suddenly changed to a large extent. Such a steep change in the non-linear component may prevent the signal from being properly received because the current control based on the result of the measurement of the non-linear component cannot be performed in time.

SUMMARY OF THE INVENTION

An object of the present invention is to provide a digital receiver in which the receiving operation is less susceptible to a change in an operating parameter of a circuit component, a control method of the digital receiver, a computer program product, and a recording medium recording the computer program product thereon.

According to the present invention, a digital receiver includes:

plural circuit components including a circuit component which constitutes a receiving unit receiving a signal sequence which is arranged so that a desired signal and a signal different from the desired signal are lined up in time series, the desired signal indicating desired data which includes at least one of text data, sound data, image data, and a computer program product; and an operating parameter changing unit which changes an operating parameter of at least one of the plural circuit components, during a period in which the receiving unit receives the signal different from the desired signal.

According to the present invention, a control method of a digital receiver includes the step of:

changing an operating parameter of one of plural circuit components which include a circuit component constituting a receiving unit receiving a signal sequence which is arranged so that a desired signal and a signal different from the desired signal are lined up in time series, the desired signal indicating desired data which includes at least one of text data, sound data, image data, and a computer program product, the operating parameter being changed during a period in which the receiving unit receives the signal different from the desired signal.

According to the present invention, a computer program product causes a digital receiver, which includes plural circuit components including a circuit component constituting a receiving unit receiving a signal sequence which is arranged so that a desired signal and a signal different from the desired signal are lined up in time series, to change an operating parameter of one of the plural circuit components during a period in which the receiving unit receives the signal different from the desired signal, the desired signal indicating desired data which includes at least one of text data, sound data, image data, and a computer program product.

According to the present invention, an operating parameter is changed during a period of receiving a signal different from a desired signal. For this reason, the change in the operating parameter does not easily influence on the desired signal by which desired data such as text data is obtained. In other words, a change in an operating parameter does not easily influence on the receiving of a target signal. It is noted that the digital receiver of the present invention includes both a receiver-only device and a device which sends and receives data.

In another aspect of the present invention, a digital receiver comprises:

plural circuit components including a circuit component which constitutes a receiving unit receiving a signal sequence which is arranged so that first and second signals which have been subjected to different types of signal processing are lined up in time series; and an operating parameter changing unit which changes an operating parameter of at least one of the plural circuit components, during a period in which one of the first and second signals, which has been subjected to the type of signal processing with which the signal is easily received, is received.

In another aspect of the present invention, a control method of a digital receiver comprises the step of:

changing an operating parameter of at least one of plural circuit components which include a circuit component constituting a receiving unit receiving a signal sequence which is arranged so that first and second signals having subjected to different types of signal processing are lined up in time series, the operating parameter being changed during a period in which the receiving unit receives one of the first and second signals which has been subjected to the type of signal processing with which the signal is easily received.

In another aspect of the present invention, a computer program product causes a digital receiver, which includes plural circuit components including a circuit component constituting a receiving unit receiving a signal sequence which is arranged so that a desired signal and a signal different from the desired signal are lined up in time series, to change an operating parameter of one of the plural circuit components during a period in which the receiving unit receives the signal different from the desired signal, the desired signal indicating desired data which includes at least one of text data, sound data, image data, and a computer program product.

According to said another aspect, an operating parameter is changed during a period in which a signal having been subjected to a type of signal processing with which the signal is easily received is received. With this, even when noise or the like is generated on account of a change in an operating parameter, the influence thereof is exerted on the signal which is easily received. Therefore the change in the operating parameter does not easily influence on the success of the receiving as compared to a case where the influence is exerted on the signal which is not easily received.

In addition to the above, the present invention may be arranged such that the first signal is modulated by a first modulation method as the aforesaid signal processing whereas the second signal is modulated, as the aforesaid signal processing, by a second method in which the number of types of modulation reference values is larger than that of the first modulation method, and the operating parameter changing unit changes an operating parameter of at least one of the plural circuit components during a period in which the receiving unit receives the first signal. According to this arrangement, a signal sequence in which two signals having different sets of modulation reference values are lined up in time series is received, and the operating parameter is changed during a period in which the signal modulated by the modulation method having a fewer types of modulation reference values is received. When the number of types of modulation reference values is small, the signal is easily demodulated. For this reason, the signal is easily demodulated in the case above as compared to a case where an operating parameter is changed in a period in which a signal in a modulation method having a larger number of types of modulation reference values is received. In other words, the change in the operating parameter does not easily influence on the success of the receiving.

The present invention may be arranged so that the first signal is encoded with a first coding rate as the aforesaid signal processing whereas the second signal is encoded with a second coding rate which is higher than the first coding rate, and the operating parameter changing unit changes an operating parameter of at least one of the plural circuit components during a period in which the receiving unit receives the first signal. According to this arrangement, a signal sequence in which two signals having different coding rates are lined up in time series is received, and the operating parameter is changed during a period in which one of the signals whose coding rate is lower than that of the other signal is received. When a coding rate is high, the signal is easily decoded. For this reason, the original signal is easily reconstructed in the case above as compared to a case where an operating parameter is changed during a period in which the signal with the lower coding rate is received. In other words, the change in the operating parameter does not easily influence on the success of the receiving. The coding rate of the present invention corresponds to a result of (the number of bits before encoding/the number of bits after encoding). The lower the coding rate is, the more the error correction is successful.

The present invention is preferably arranged so that a noise evaluation unit for evaluating the influence of a noise component on a desired component in the signal received by the receiving unit, and the operating parameter changing unit changes the operating parameter of the circuit component based on the result of the evaluation by the noise evaluation unit. According to this arrangement, the operating parameter is suitably controllable because the operating parameter is changed in consideration of the influence of the noise component on the desired component.

The present invention is preferably arranged such that the operating parameter changing unit changes the operating parameter of the circuit component from the first value to the second value, and the noise evaluation unit compares (i) the influence of the noise component on the desired component in a period in which the operating parameter of the circuit component is at the first value with (ii) the influence of the noise component on the desired component in a period in which the operating parameter of the circuit component is at the second value. According to this arrangement, the influence of the noise component on the desired component in a period in which the operating parameter of the circuit component is at the first value is compared with the influence of the noise component on the desired component in a period in which the operating parameter of the circuit component is at the second value. It is therefore possible to precisely evaluate how the influence of the noise component on the desired component changes as the operating parameter is switched from the first value to the second value.

The present invention is preferably arranged so that, after changing the operating parameter of the circuit component to the second value, the operating parameter changing unit temporarily re-changes the operating parameter to the first value, and then changes the operating parameter again based on the result of the evaluation by the noise evaluation unit. According to this arrangement, since the operating parameter is temporarily re-changed from the second value to the firs value, it is possible to restrain the signal from being influenced by the change in the operating parameter to the second value.

The present invention is preferably arranged so that the signal sequence is a signal sequence in which plural signals are lined up in time series, and the operating parameter changing unit changes the operating parameter of the circuit component at a leading end of one of the plural signals. This arrangement restrains the number of signals influenced by the change in the operating parameter.

The present invention is preferably arranged so that the signal sequence is a signal sequence in which plural signals are lined up in time series, and if the operating parameter changing unit changes the operating parameter of the circuit component at plural timings, these timings to change the operating parameter fall within a period of receiving one of the plural signals. This arrangement restrain the signal from being influenced by the change in the operating parameter.

The present invention may be arranged so that in the signal sequence, a desired signal and a signal different from the desired signal are lined up in time series, the desired signal indicating desired data which includes at least one of text data, sound data, image data, and a computer program product, and in the signal sequence received by the receiving unit, the signal different from the desired signal has been subjected to the type of signal processing with which the signal is easily received as compared to the desired signal. According to this arrangement, since the operating parameter is changed during a period in which the signal having been subjected to the type of signal processing with which the signal is easily received is received, the change in the operating parameter does not easily influence on the success of the receiving.

The present invention can be used for various types of digital receivers such as mobile phones and digital television receivers which include a reconstruction unit performing the reconstruction of at least one of text data, sound data, image data, and a computer program product.

The aforesaid computer program product may be distributed in the form of data recorded on a computer-readable removable recording medium such as a CD-ROM (Compact Disc Read Only Memory) disc, a flexible disc (FD), an MO (Magneto Optical) disc, or in the form of data recorded on a computer-readable fixed recording medium such as a hard disc. Alternatively, the aforesaid computer program product may be distributed over a communications network such as the Internet by a wired or wireless electrical communication unit. The computer program product is not specialized for the digital receiver. For example, the computer program product may be combined with another computer program product which causes a computer to execute other processes, so as to cause a general-purpose computer including a general-purpose processor and the like to function as a digital receiver.

BRIEF DESCRIPTION OF THE DRAWINGS

Other and further objects, features and advantages of the invention will appear more fully from the following description taken in connection with the accompanying drawings in which:

FIG. 2 is a schematic diagram showing an example of a signal sequence received by the portable communications device of FIG. 1.

DESCRIPTION OF THE PREFERRED EMBODIMENTS

Figure 1A:
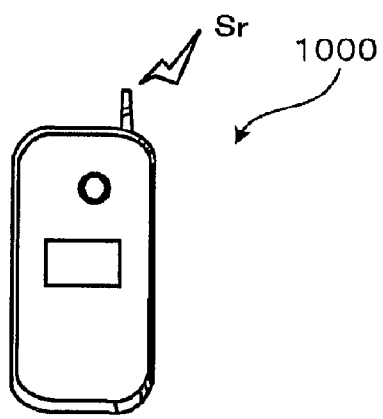
FIG. 1A briefly shows the external appearance of a portable communications device of a First Embodiment of the present invention.
Figure 1B:
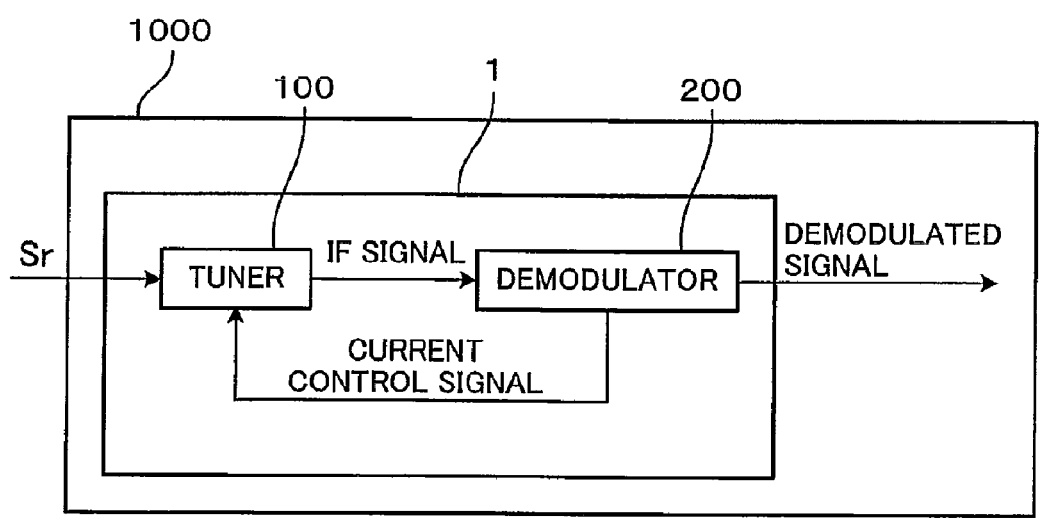
FIG. 1B is a block diagram which outlines the portable communications device.

The following explains an example of a preferred embodiment of the present invention. FIG. 1A is an elevation of a portable communications device 1000 of the present embodiment. FIG. 2A schematically shows the entirety of a digital demodulator 1 provided in the portable communications device 1000.

The portable communications device 1000 of the present embodiment includes a digital demodulator 1 (digital receiver). The portable communications device 1000 receives a signal Sr from an antenna and this signal is demodulated by the digital demodulator 1. From the demodulated signal output from the digital demodulator 1, various types of information regarding data such as text, image, and sound, are fetched, so that data such as text, image, sound, and computer program product is reconstructed. Such a text, image, or the like is presented to the user of the portable communications device 1000, through an unillustrated display, speaker or the like of the portable communications device 1000. It is noted that, apart from the portable communications device, the digital demodulator 1 may be used in apparatuses such as a digital television, a wireless LAN (Local Area Network) apparatus, and a PC (Personal Computer) with a wireless LAN capability.

The digital demodulator 1 includes a tuner 100 (receiving unit) and a demodulator 200. The tuner 100 performs channel selection on the signal Sr. That is to say, the tuner 100 selectively receives a particular frequency bandwidth of the signal Sr. The signal of the selectively-received channel is then converted into an IF (Intermediate Frequency) signal Si and sent to the demodulator 200. The demodulator 200 receives the signal Si from the tuner 100, generates a demodulated signal from the signal Si, and outputs the demodulated signal.

The digital demodulator 1 is constituted by plural circuit components. Unless otherwise stated, each circuit component may be a group of circuit elements each specialized to an individual function or may be software such as a computer program product and data, which causes hardware such as a general-purpose processor circuit and memory to execute the below-described functions. In the latter case, a circuit component is a combination of hardware and software.

The demodulator 200 sends a current control signal to the tuner 100. Based on the current control signal from the demodulator 200, the tuner 100 supplies a current to each circuit component. This current control will be detailed below.

<Signal Sequence>

The following explains a signal sequence that the portable communications device 1000 receives in the present embodiment. FIG. 2 schematically shows the signal sequence. This signal sequence is made up of plural frames lined up in time series. As shown in FIG. 2(a), a single frame is made up of N (N is a natural number not smaller than 2) signal blocks having the same time length. These signal blocks are divided into plural channels. A single channel is made up of one or more signal block(s). At least one of these channels is a control channel which includes an attribute signal indicating the attribute of each signal such as an arrangement of channels in one frame and the modulation method and coding rate of each signal in the signal blocks. In the remaining part of the channel included is plural service channels used for services such as sound transmission and video transmission. For example, the signal blocks of the present embodiment are arranged so that a block 0 is assigned to a control channel Ch0, blocks 1 to 3 are assigned to a service channel Ch1, and blocks 4 and 5 are assigned to a service channel Ch2.

As FIG. 2(b) shows, each signal block is constituted by a single beacon signal and K (K is a natural number not smaller than 2) OFDM (Orthogonal Frequency Division Multiplexing) symbols subsequent to the beacon signal. The beacon signal includes a synchronization signal made up of plural sub carrier signals. The synchronization signal is used for establishing synchronization in each block signal. Each sub carrier signal of the synchronization signal includes a modulated signal which has been modulated to indicate a particular sequence of numbers. This modulated signal is made up of plural unit signals modulated by a predetermined modulation method.

Each OFDM symbol includes many sub carrier signals. Each sub carrier signal includes a modulated signal modulated by a predetermined modulation method. This modulated signal is made up of plural unit signals modulated to indicate audio data, image data, or the like. Each OFDM symbol further includes copy signals such as guard interval and cyclic prefix, in addition to the effective region including data. These copy signals have the same signal component as a part of the effective region, and are inserted between the respective active regions of two temporally neighboring OFDM symbols. These copy signals are used for, for example, removing from an input signal the influence of multipath waves occurring in the transmission path from the sender of the signal sequence to the portable communications device 1000.

Each OFDM symbol further includes plural pilot signals. Pilot signals are continuous pilot signals or discrete pilot signals. Continuous pilot signals are temporally continuous within a single sub carrier signal, whereas discrete pilot signals are discrete from one another in the frequency direction or in time. These pilot signals, for example, are a sequence of numbers represented by a particular coding and are inserted into a signal sequence in a predetermined order. It is therefore possible to reproduce the series of numbers represented by the particular coding, by identifying, in the predetermined order, the numbers indicated by the respective pilot signals in the signal sequence.

In addition to the above, a signal sequence of the present embodiment is encoded in various ways and subjected to interleave which is required to perform error correction for correcting an error in the signal sequence. Examples of encoding methods for the encoding above are LDPC (Low Density Parity Check) encoding, RS (Reed-Solomon) encoding, and Viterbi encoding. Examples of the interleave include bit interleave, byte interleave, time interleave, and frequency interleave. In these methods, sets of data corresponding to respective signals in a transmitted signal are reordered in according with time, frequency, or the like. The signal sequence having been interleaved and variously encoded is decoded and deinterleaved in a manner as below in the portable communications device 1000, with the result that an error in the signal sequence may be corrected.

<Tuner>

Figure 3:
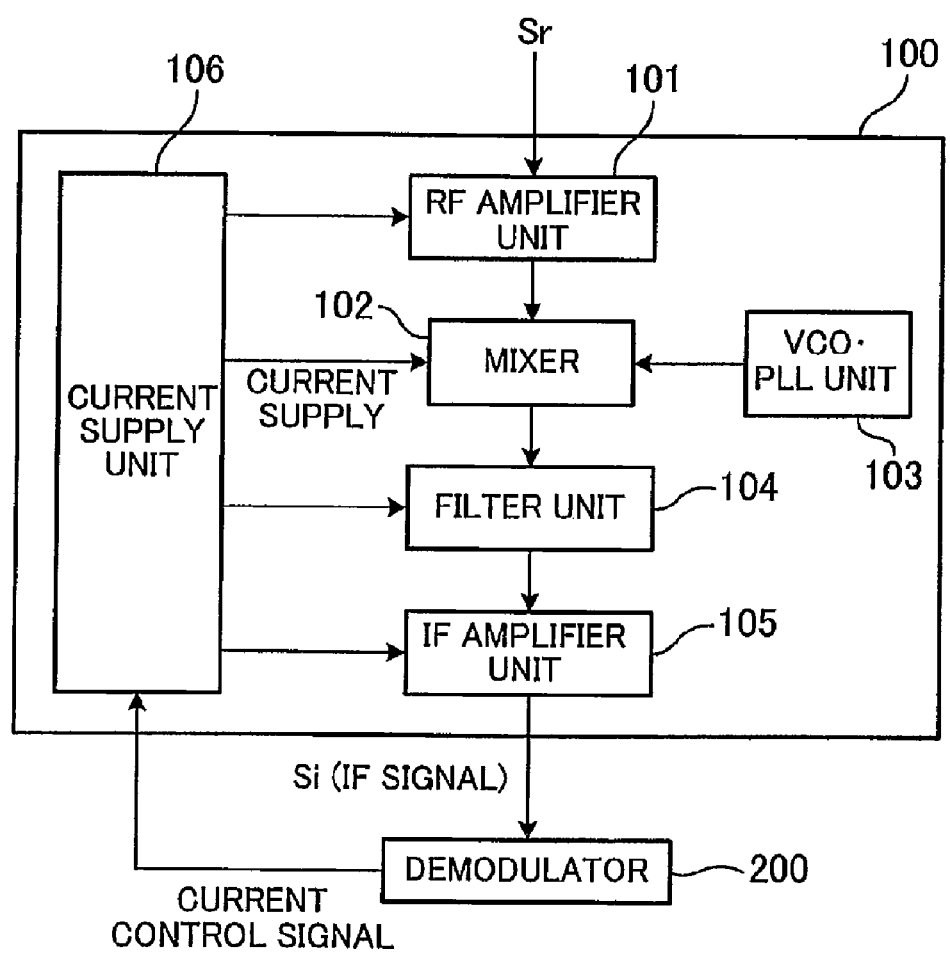
FIG. 3 is a block diagram showing the tuner of FIG. 1 and its surroundings.

Attention is now directed to the tuner 100. FIG. 3 is a block diagram of the tuner 100. The tuner 100 includes an RF amplifier unit 101, a mixer 102, a VCO·PLL unit 103, a filter unit 104, an IF amplifier unit 105, and a current supply unit 106. The signal Sr input to the tuner 100 is amplified by the RF amplifier unit 101 and then output to the mixer 102. On the other hand, the VCO·PLL unit 103 generates a mixing signal which corresponds to a desired frequency bandwidth that the portable communications device 1000 receives the mixing signal generated by the VCO·PLL unit 103 is output to the mixer 102. The mixer 102 generates an IF signal Si corresponding to the IF frequency, based on the output signal Sr supplied from the RF amplifier unit 101 and the mixing signal supplied from the VCO·PLL unit 103.

The IF signal Si generated by the mixer 102 is output to the filter unit 104. The filter unit 104 removes an unnecessary signal component from the output signal Si supplied from the mixer 102. After the removal of the unnecessary signal component, the signal Si is supplied to the IF amplifier unit 105. The IF amplifier unit 105 amplifies the signal Si supplied from the filter unit 104 and then outputs the amplified signal Si to the demodulator 200.

The current supply unit 106 supplies a bias current to members such as the RF amplifier unit 101. The current supply unit 106 receives a current control signal from the demodulator 200. This current control signal includes a signal which indicates the intensity of the supply current supplied to each circuit component such as the RF amplifier unit 101. The current supply unit 106 supplies, to the RF amplifier unit 101 or the like, the current having the intensity indicated by the current control signal.

<Demodulator>

Figure 4:
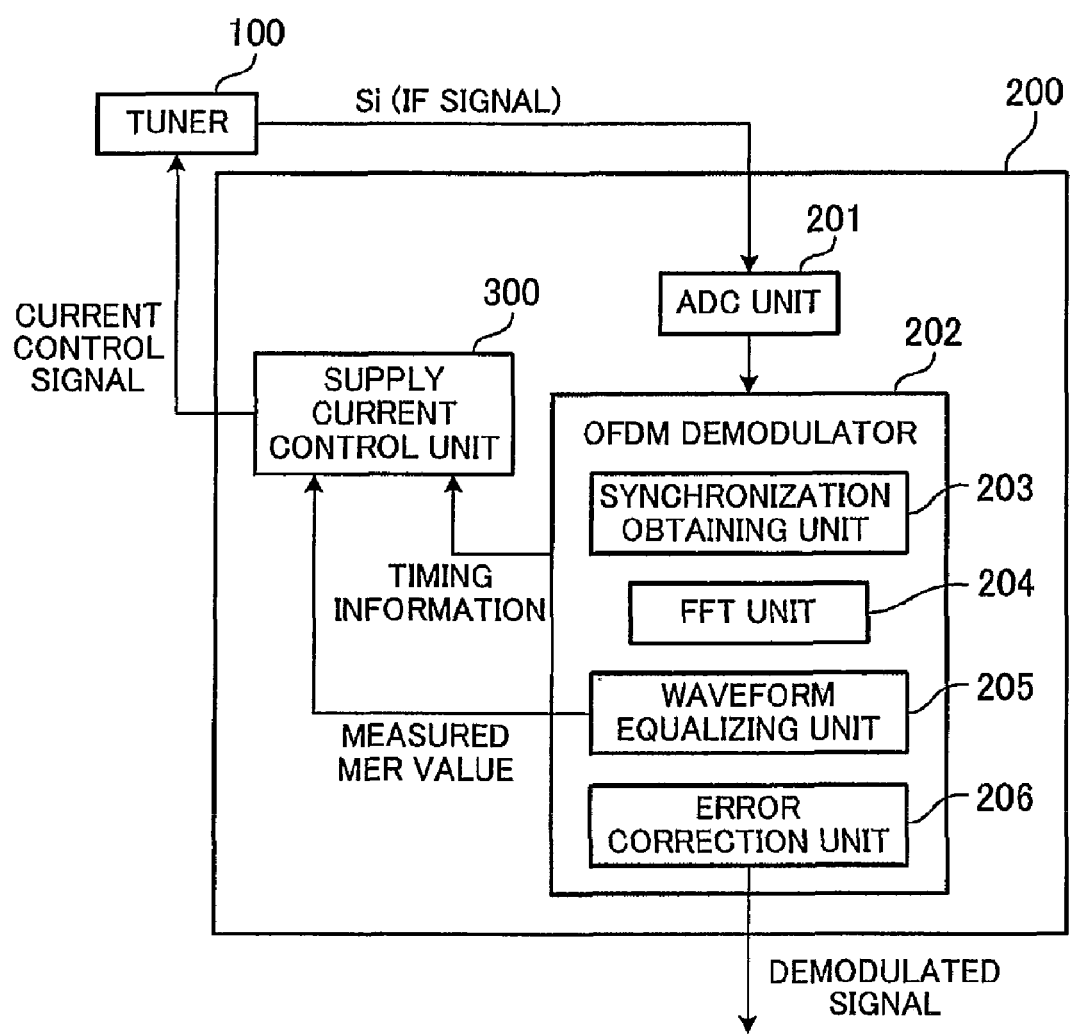
FIG. 4 is a block diagram showing the demodulator of FIG. 1 and its surroundings.

Attention is now directed to the demodulator 200. FIG. 4 is a block diagram of the demodulator 200. As shown in FIG. 4, the demodulator 200 is constituted by plural circuit components such as a below-described ADC unit 201.

The demodulator 200 includes an ADC unit 201, an OFDM demodulator 202, and a supply current control unit 300. The IF signal Si output from the tuner 100 is input to the ADC unit 201. The ADC unit 201 converts the input signal Si, which is an analog signal, into a digital signal. The ADC unit 201 outputs this digital signal to the OFDM demodulator 202.

The OFDM demodulator 202 includes a synchronization obtaining unit 203, an FFT unit 204, an waveform equalizing unit 205, and an error correction unit 206. The synchronization obtaining unit 203 obtains the synchronization of an OFDM symbol by determining the later-described Fourier transformation by the FFT unit 204, i.e. determining the symbol synchronization point. A point determined as the symbol synchronization point is at which the optimum receiving is possible on account of the least influence of multipath waves. Such determination of the synchronization point is performed in such a way that, for example, the correlation between signals is referred to or a phase difference is corrected with reference to a pilot signal.

The FFT (Fast Fourier Transform) unit 204 conducts (time-frequency) Fourier transform of the signal supplied from the ADC unit 201, based on the symbol synchronization point obtained by the synchronization obtaining unit 203. This Fourier transformation is typically fast Fourier transformation (FFT). The FFT unit 204 conducts fast Fourier transformation of the beacon signal and each OFDM symbol.

The waveform equalizing unit 205 conducts a waveform equalizing process to the Fourier-transformed beacon signal and a unit signal of the Fourier-transformed OFDM symbol. First, the waveform equalizing unit 205 obtains a synchronization signal from the beacon signal and extracts pilot signals from the OFDM symbols. In the meanwhile, the waveform equalizing unit 205 serially generates, as a reference signal, a signal indicating a series of numbers which is based on a predetermined coding used in the synchronization signal and pilot signal. Thereafter the waveform equalizing unit 205 calculates differences on the constellation between the reference signal and the synchronization signal and between the reference signal and the pilot signal. Based on the calculated differences on the constellation, the waveform equalizing unit 205 conducts the waveform equalizing process with respect to the unit signals included in the OFDM symbols. Furthermore, the waveform equalizing unit 205 demaps on each data value a unit signal after the waveform equalizing process, based on a predetermined modulation method. The result of the demapping is output to the error correction unit 206.

While demapping the unit signals, the waveform equalizing unit 205 calculates for each unit signal a difference between the constellation of the unit signal after the waveform equalizing process and the reference value of the constellation, i.e. calculates an MER (Modulation Error Ratio) value. This MER value indicates an error regarding the constellation of a received signal. A signal supplied to the waveform equalizing unit 205 may include various noise components, in addition to a desired component concerning the information transmitted by the signal. The aforesaid error regarding the constellation is mainly generated on account of various noise components generated on the transmission path to the waveform equalizing unit 205. The MER value of the present embodiment is calculated so that, the higher the MER value is, the smaller the intensity of the noise components in comparison with the intensity of the entire signal. The MER value that the waveform equalizing unit 205 calculates for each unit signal is supplied to the later-described supply current control unit 300, in the order of being subjected to the waveform equalizing process.

The error correction unit 206 conducts an error correction process to the signal demapped by the waveform equalizing unit 205. The error correction process is constituted by deinterleaving and decoding corresponding to the interleaving and coding on the signal by the sender. The signal which has been variously interleaved is reconverted to the signal before the interleaving, by the deinterleaving. Also, the signal which has been coded is reconverted into the signal before the coding, by the decoding. As a result of this, the various errors occurring on the signal in the transmission path are corrected. In addition to this, the error correction unit 206 may measure an amount of required error correction when the signal is subjected to the error correction process, so as to calculate a BER (Bit Error Rate). The calculated BER may be output to the later-described supply current control unit 300. As discussed above, the demodulated signal after being demodulated by the demodulator 200 is output from the demodulator 200.

The OFDM demodulator 202 outputs, to the supply current control unit 300, (i) the information of the symbol synchronization point that the synchronization obtaining unit 203 has obtained and (ii) timing information indicating timings to receive a block signal and channel control signal.

As described above, the measured MER value calculated by the waveform equalizing unit 205 indicates the influence of noise components on a desired component in the signal. Such noise components are roughly divided into the following two types. A first-type noise component is generated because the signal received by the portable communications device 1000 includes interfering waves. The interfering waves are equivalent to those frequency components different from a desired frequency component from which information is fetched by demodulating the signal. The received signal includes signals such as signals of channels neighboring to the desired frequency component and signals which are sent from senders different from the communication counterpart. Such signals may function as the interfering waves. A second-type noise component is generated on account of reasons such as thermal noise of the circuit components. Hereinafter, the first-type noise component will be referred to as interference wave noise and the second-type noise component will be referred to as other noise.

Figure 5:
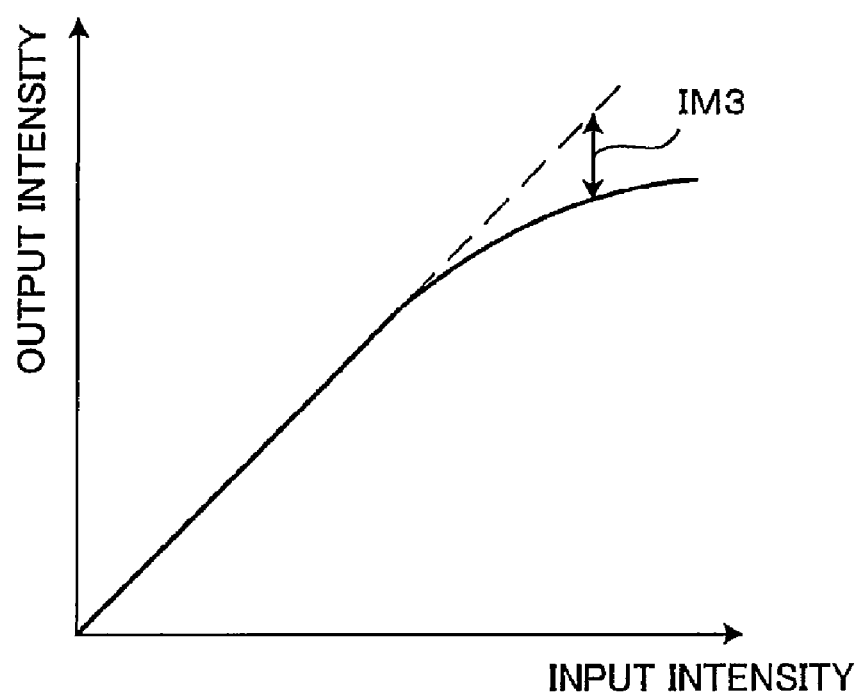
FIG. 5 is a graph of a case where a signal is skewed in a circuit component.

The interference wave noise induces signal skew because interference waves which are in the received signal and are not a desired wave influence on the frequency of the desired wave on account of the non-linearity of each circuit component. For example, the dotted line in FIG. 5 indicates a case where the output signal is amplified linearly in an optimal manner in response to the intensity of the signal input to the RF amplifier unit 101. In the meanwhile, the signal output from the RF amplifier unit 101 includes a component which is non-linear with respect to the input signal. Such a non-linear component is intensified as the intensity of the signal input to the RF amplifier unit 101 increases. In addition to this, the intensity of the non-linear component changes in accordance with an IIP3 (3rd order Input Intercept Point) of the RF amplifier unit 101. This IIP3 is one of indicators of the linearity of the circuit. When the signal input to the RF amplifier unit 101 includes interference waves, non-linear components of the signal output from the RF amplifier unit 101 include those generated by the interference waves. Such components may function as noise components in relation to the desired component, as inter-modulation distortion and cross-modulation distortion, for example. Such noise components are the interference wave noise. The solid line in FIG. 5 indicates a case where the signal output from the RF amplifier unit 101 is skewed due to the inter-modulation distortion (IM3). The interference wave noise is intensified as the intensity of interference waves in the input signal is increased.

On the other hand, the other noise is generated due to the heat from a resistive element in a circuit component, the base resistance and emitter resistance of a transistor, and the like. The other noise also includes so-called shot noise which occurs when electric charges move across an energy barrier in case that an analog circuit has pn (positive-negative) junction, for example, and so-called flicker noise which is generated when electric charges are trapped at the interface between the oxide of MOSFET (Metal-Oxide-Semiconductor Field Effect Transistor) and silicon. Being different from the aforesaid interference wave noise, these types of noise are more or less at a constant level unless the operating environment of the circuit component is changed, irrespective of the intensity of the input signal to the circuit component.

<Current Control>

The linearity of a circuit component varies in accordance with the current supplied to that circuit component. For example, in an analog circuit, the linearity of the output signal with respect to the input signal is improved as the current supplied to this circuit component is intensified.

For the reason above, when the receiving state of the portable communications device 1000 is not good and the signal that the tuner 100 receives includes interference waves in addition to a desired wave, the linearity of a circuit component is improved by intensifying the current supplied to that circuit component. This makes it possible to restrain non-linear components of the signal Si supplied from the tuner 100. On the other hand, when the receiving state of the portable communications device 1000 is good, the interference waves in the signal that the portable communications device 1000 receives are inconspicuous and hence the non-linear components may not be at a problematic level even if the linearity of the circuit component is not improved so much. However, even in this case, the power consumption of the tuner 100 may be excessive when the current supplied to the circuit component is intense.

Figure 6:
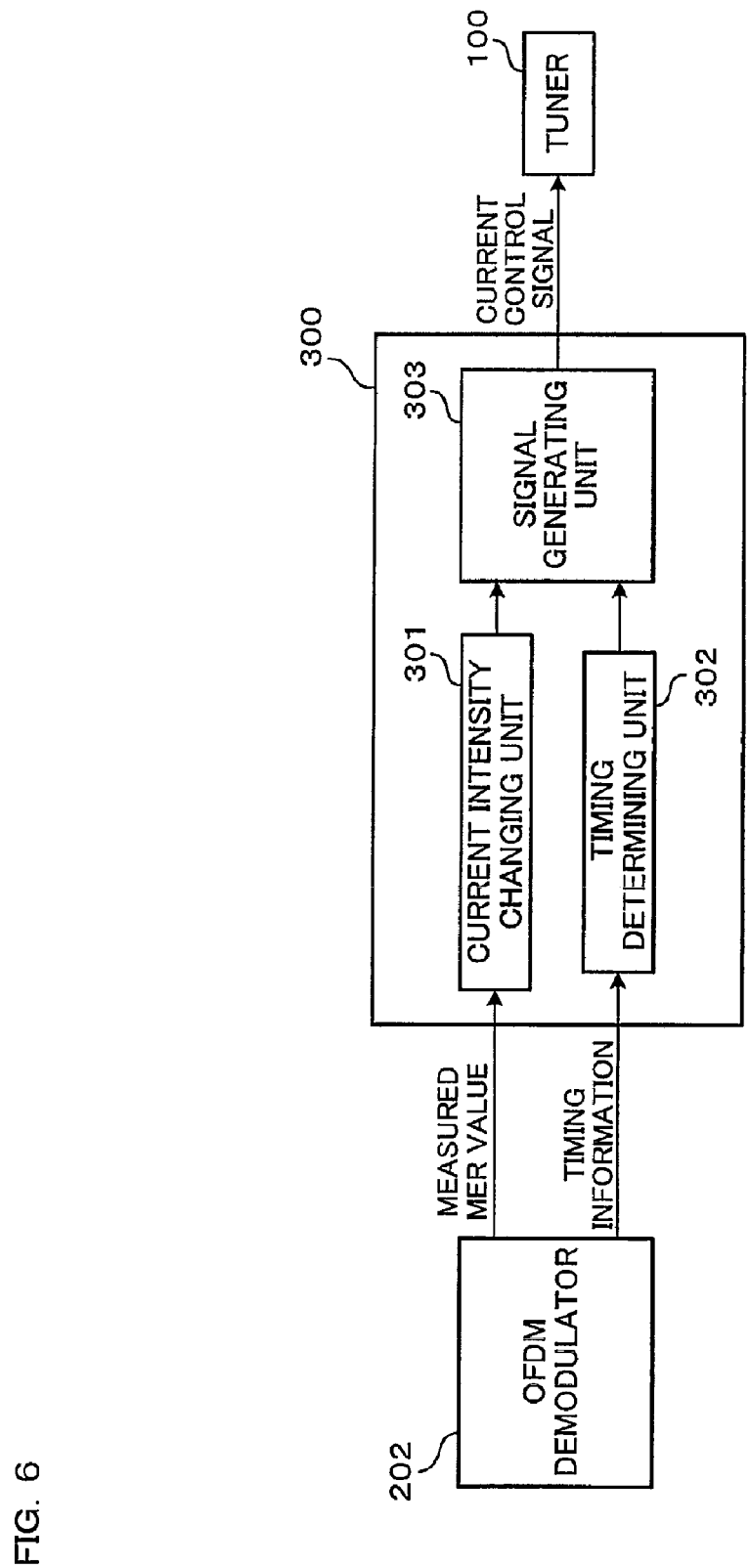
FIG. 6 is a block diagram showing the supply current control unit of FIG. 4 and its surroundings.

In consideration of the above, the demodulator 200 of the present embodiment is provided with the supply current control unit 300. FIG. 6 is a block diagram of the supply current control unit 300. The supply current control unit 300 includes a current intensity changing unit 301 (noise evaluation unit), a timing determining unit 302, and a signal generating unit 303.

The current intensity changing unit 301 determines whether to change the intensity of the current supplied to each of the RF amplifier unit 101, the mixer 102, the filter unit 104, and the IF amplifier unit 105, based on the measured MER value supplied from the waveform equalizing unit 205. If it is determined that the intensity of the current is changed, the current intensity changing unit 301 determines the intensity of the current after the change. The timing determining unit 302 determines the timing to change the intensity of the supply current based on timing information from the OFDM demodulator 202, when the current intensity changing unit 301 has determined to change the intensity of the supply current.

The signal generating unit 303 generates a current control signal and outputs this signal to the tuner 100, when the current intensity changing unit 301 has determined that the intensity of the supply current is not changed. The current control signal indicates an instruction to maintain the current intensity of the current as it is. In the meanwhile, if the current intensity changing unit 301 has determined that the intensity of the supply current is changed, the signal generating unit 303 generates a current control signal and outputs the signal to the tuner 100. This current control signal indicates an instruction to change the intensity of the supply current to the current intensity determined by the current intensity changing unit 301, at the timing determined by the timing determining unit 302. In this way, the supply current control unit 300 functions as an operating parameter changing unit which changes an operation parameter of a circuit component, which is the current supplied to the circuit component.

The current intensity changing unit 301 is further detailed. The current intensity changing unit 301 has detection reference values based on which whether the receiving state is good or not is determined. The detection reference values include a current decrease reference value which functions as a reference for current decrease and a current increase reference value which functions as a reference for current increase. For example, the current increase reference value is arranged to be greater by a predetermined value than the lowest MER value with which image data or the like is reproducible from the signal after the demodulation, whereas the current decrease reference value is an MER value greater than the current increase reference value.

The current intensity changing unit 301 compares the current decrease reference value with the measured MER value, and determines that the receiving state is improved if the measured MER value is greater than the current decrease reference value. In addition to this, the current intensity changing unit 301 compares the current increase reference value with the measured MER value, and determines that the receiving state is worsened if the measured MER value is smaller than the current increase reference value. It is determined that the receiving state is maintained as it is if the measured MER value is not smaller than the current increase reference value and not greater than the current decrease reference value.

If it is determined that the receiving state is maintained, the current intensity changing unit 301 determines not to change the intensity of the supply current. On the other hand, if it is determined that the receiving state is improved or worsened, the current intensity changing unit 301 determines to change the intensity of the supply current, so as to change the current intensity after the change. The current intensity changing unit 301 determines the current intensity after the change in such a way as to decrease the supply current, if it is determined that the receiving state is improved. On the other hand, the current intensity changing unit 301 determines the current intensity after the change in such a way as to improve the linearity of the circuit component, if it is determined that the receiving state is worsened.

As such, the current intensity changing unit 301 changes the intensity of the supply current to the circuit component based on the measured MER value, in order to restrain the power consumption when the receiving state is good or in order to facilitate the reception of the signal by improving the linearity, when the receiving state is worsened. This makes it possible to suitably control the power consumption in accordance with the receiving state.

The timing determining unit 302 is further detailed. The linearity of the circuit component is changed as the intensity of the supply current thereto is changed, so that a non-linear component of the output signal from the circuit component may be changed. In such a case, however, it is in some cases difficult to anticipate to what extent the non-linear component is changed. When the non-linear component is too large, the signal may not be properly demodulated. It is therefore preferable as much as possible to change the intensity of the supply current at a timing at which the decoding process is not influenced. For this reason the timing determining unit 302 determines the timing to change the intensity of the supply current not to influence on the demodulating process as much as possible.

Specifically, when the current intensity changing unit 301 determines that the intensity of the supply current is changed, the timing determining unit 302 determines the timing to change the intensity of the supply current based on any one of the following four bases.

The first basis is whether the signal block is a service channel (desired signal) which is the target of receiving or another type of signal (i.e. a signal different from the desired signal). If the tuner 100 changes the supply current intensity at the timing to receive a signal block belonging to the target service channel, an adverse effect may be caused on the process of demodulating the signal block of the service channel.

As discussed above, each signal block belongs to any one of service channels or to a control channel. For example, provided that a currently-received service channel is the channel Ch2 of FIG. 2, the signal blocks 4 and 5 in the service channel Ch2 do not have high priority as the targets of timing selection whereas the signal blocks 0 to 3 in the control channel Ch0 and the service channel Ch2 have high priority, according to the first basis. In other words, according to the first basis, the timings at which the tuner 100 receives the signal blocks 0 to 3 are likely to be selected, whereas the timings at which the signal blocks 4 and 5 are received are not likely to be selected. This causes the process of demodulating the target service channel to be less influenced by the change in the intensity of the supply current.

The second basis is whether the timing in a signal block is equivalent to the OFDM symbol (desired signal) or the timing in a signal block is equivalent to another signal (i.e. a signal different from the desired signal). The OFDM symbol is a signal including sound data, image data, or the like which is provided by the target service channel. For this reason, if the tuner 100 changes the supply current at the timing to receive the OFDM symbol, an adverse effect may be caused to the acquisition of sound data or the like. According to the second basis, the timing equivalent to the OFDM symbol is less prioritized than the timing equivalent to a signal different from the OFDM symbol. In other words, according to the second basis, the timing at which the tuner 100 receives a signal different from the OFDM symbol, i.e. receives a beacon signal is likely to be selected, whereas the timing at which the OFDM symbol is received is not likely to be selected. This causes the acquisition of sound data or the like to be less influenced by the change in the intensity of the supply current.

The third basis relates to the modulation method. There are various modulation methods such as BPSK (Binary Phase Shift Keying), QPSK (Quadrature Phase Shift Keying), and 16QAM (Quadrature Amplitude Modulation). A unit signal included in the sub carriers of the signal is modulated according to one of the methods above so as to indicate a particular value. The type of the modulation reference values of the unit signal differs according to the modulation method. For example, provided that a constellation is represented by an I component and a Q component, the constellations referred to in the BPSK are $(I,Q)=(1/\sqrt{2}, 1/\sqrt{2})$ and $(I,Q)=(-1/\sqrt{2}, -1/\sqrt{2})$. The constellations referred to in the QPSK are $(I,Q)=(1/\sqrt{2}, 1/\sqrt{2})$, $(-1/\sqrt{2}, 1/\sqrt{2})$, $(-1/\sqrt{2}, -1/\sqrt{2})$, and $(1/\sqrt{2}, -1/\sqrt{2})$. Furthermore, the constellations referred to in the 16QAM are 16 types of values.

In the meanwhile, the easiness of demodulation of a signal differs according to the modulation method. For example, when a unit signal is deviated from a referential constellation on account of a noise occurring on the transmission path, the correct constellation is easily obtained in the BPSK, as compared to the case of the QPSK. Since there are only two modulation reference values in the BPSK, a small deviation from the constellation does not often result in mis-indication of the wrong modulation reference value. On the other hand, since there are four modulation reference values in the QPSK, a deviation from the constellation easily results in mis-indication of a wrong modulation reference value. For this reason, as a deviation from the constellation occurs on account of the change in the intensity of the supply current, demodulation tends to be precisely done in the BPSK in comparison with the QPSK.

For the reason above, in the third basis a modulation method in which the number of types of modulation reference values is small is preferred to a modulation method in which the number of types of modulation reference values is large. For example, when the beacon signal is modulated by the BPSK whereas the OFDM symbol is modulated by the QPSK, the timing at which the tuner 100 receives the beacon signal is likely to be selected whereas the timing at which the OFDM symbol is received is not likely to be selected, according to the third basis. As a result of this, the change in the intensity of the supply current does not easily influence on precise demodulation of a signal.

The fourth basis relates to encoding for error correction. Whichever type of coding is used, it is possible to select various kinds of coding rates. Since error correction is easy as the coding rate is low, an error caused by the change in the supply current can be easily corrected when the coding rate is low. For this reason, the fourth basis is arranged so that a low coding rate is preferred to a high coding rate. For example, assume that the coding rate of the LDPC code is ½ in the beacon signal whereas the coding rate of the LDPC code is ¾ in the OFDM signal. In this case, according to the fourth basis, the timing at which the tuner 100 receives the beacon signal is likely to be selected whereas the timing at which the OFDM symbol is received is unlikely to be selected. As a result of this, the change in the intensity of the supply current does not easily influence on precise error correction of a signal.

As discussed above, the beacon signal includes a synchronization signal used for obtaining synchronization for each block signal. This synchronization signal is therefore important for obtaining synchronization. However, when temporally continuous block signals are received, the beacon signals in the block signals other than the leading block signal are not so important once after the synchronization is obtained by using the beacon signal of the leading block signal. For example, when receiving the service channel Ch1 of FIG. 2, the beacon signals of the block signals 2 and 3 among the block signals 1 to 3 in the service channel Ch1 are less important if the beacon signal of the block signal 1 is used for obtaining synchronization. In this way, there are important and unimportant beacon signals in accordance with the timings of receiving. Therefore the intensity of the supply current is preferably changed at the timing of receiving an unimportant beacon signal.

The control channel indicates information such as the channel arrangement in a frame and the modulation method, as discussed above. The control channel is therefore a signal important for obtaining these kinds of information. However, once the information is obtained, the control channel may not be important to receive subsequent frames. As such, there are important and unimportant control channels in accordance of the timings of receiving. Therefore the intensity of the supply current is preferably changed at the timing to receive an unimportant control channel.

<Supply Current Control Process>

Figure 7:
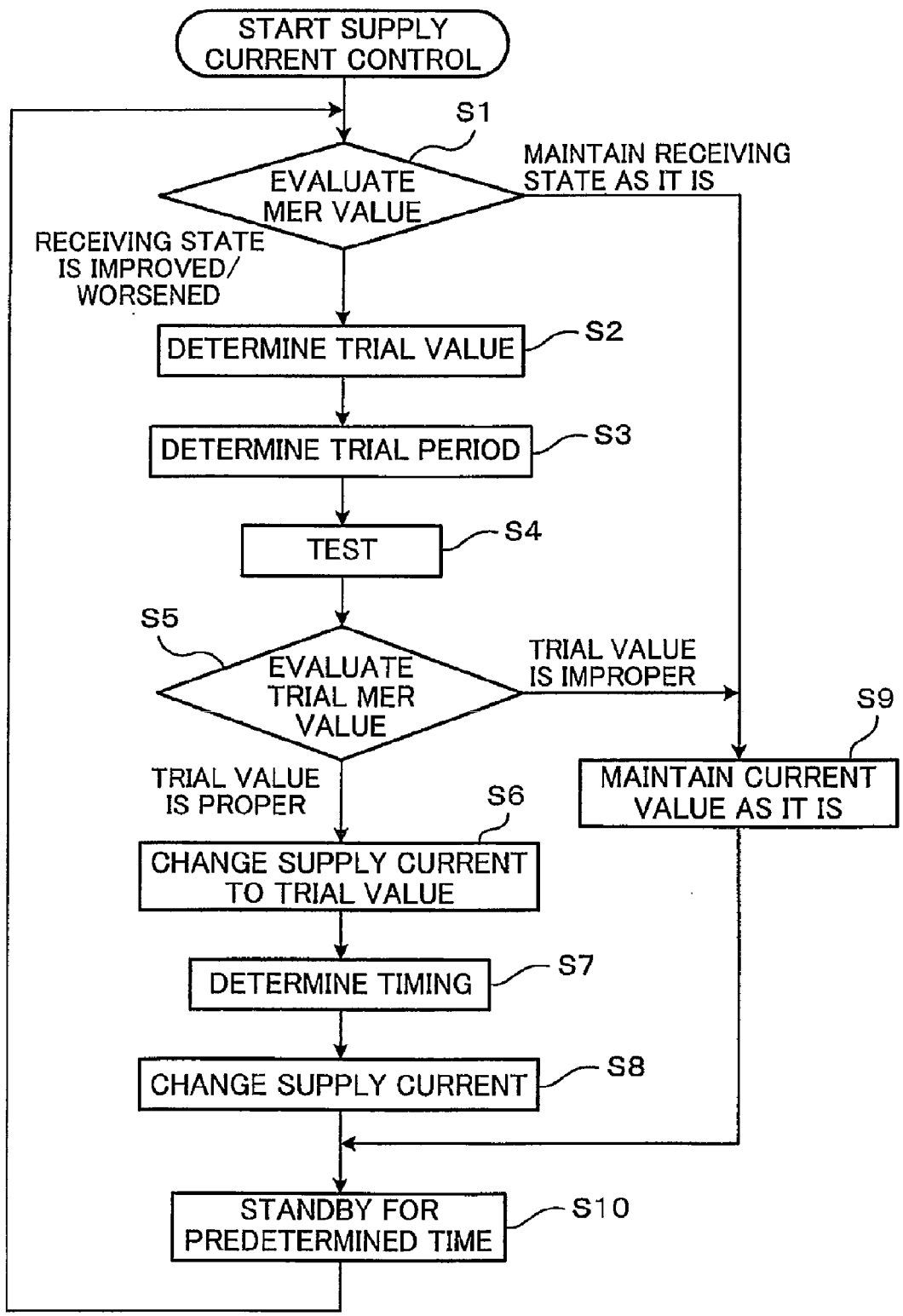
FIG. 7 is a flowchart showing the steps of a supply current control process executed by the supply current control unit.
Figure 8:
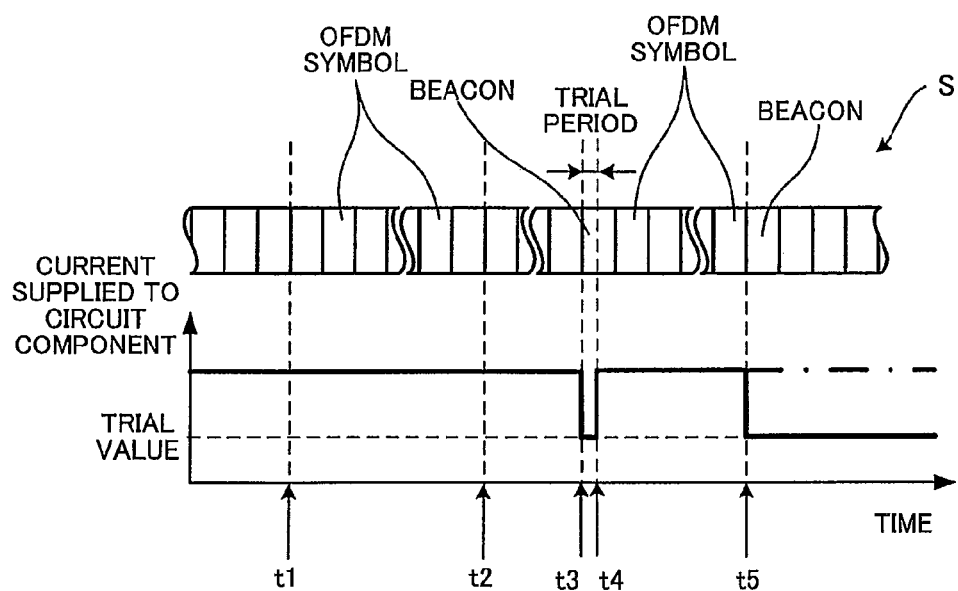
FIG. 8 is a timing chart different from FIG. 6, showing changes in a supply current to a circuit component in the tuner and changes in the gain of the amplifier unit.

Discussed below is a specific example of a supply current control process executed by the supply current control unit 300. FIG. 7 is a flowchart of the steps performed in the example. FIG. 8 shows a relationship between (i) a graph showing changes in the intensity of the supply current to the circuit component over time and (ii) the timings at which the tuner 100 receives a signal sequence S.

First, the current intensity changing unit 301 calculates an average of measured MER values transmitted from the waveform equalizing unit 205, during the period from t1 to t2 in FIG. 8, and evaluates the influence of noise components based on the calculated average (step S1). The evaluation is carried out by comparing the average of measured MER values with a reference value. When the average exceeds a current decrease reference value, it is determined that the receiving state is improved. On the other hand, it is determined that the receiving state is worsened if the average of measured MER values is below a current increase reference value.

When the current intensity changing unit 301 has determined that the receiving state is neither improved nor worsened, i.e. the receiving state is maintained as it is (step S1, "receiving state maintained"), the signal generating unit 303 generates a current control signal instructing to maintain the current intensity as it is, and outputs the signal to the tuner 100 (step S9). Then the process proceeds to the step S10. If the current intensity changing unit 301 has determined that the receiving state is improved or worsened (step S1, "receiving state improved/worsened"), a trial value of current change is determined (S2). Thereafter the timing determining unit 302 determines a trial period in which the current is changed (S3).

The trial value and trial period are determined in order to perform a test change in the supply current intensity. Such a test is necessary for evaluating how the influence of noise components on a desired component actually changes in the signal Si supplied from the tuner 100 to the demodulator 200. The test change is carried out by tentatively changing the intensity of the supply current and measuring the MER value after the change.

Specifically, the current intensity changing unit 301 determines the trial value so that the supply current is decreased, when it has been determined in S1 that the receiving state is improved. On the other hand, the unit 301 determines the trial value so that the linearity of the circuit component is improved, if it has been determined in S1 that the receiving state is worsened. FIG. 8 shows a case where the supply current is decreased in the trial period, as an example.

Then the timing determining unit 302 determines the timings to start and end the trial period, in accordance with one of the aforesaid first to fourth bases. For example, FIG. 8 shows a case where, according to the second basis or the like, the timing t3 to start the trial period and the timing t4 to end the period are the timings at which the beacon signals which are different from the OFDM symbol are received. The timing t3 at which the trial period starts is when the supply current intensity is changed to a trial value, whereas the timing t4 at which the trial period ends is when the supply current intensity returns to the original from the trial value.

The timing determining unit 302 determines the start timing of the trial period to be a time equivalent to the leading edge of a beacon signal, such as the timing t3 of FIG. 8. This minimizes the number of signals receiving an adverse effect such as disturbance occurring when the supply current intensity is changed. Also, the timing determining unit 302 determines the end timing of the trial period so that the trial period is not longer than the beacon signal, such as the timing t4 of FIG. 8. As a result, the period in which the linearity of the circuit component changes due to the change in the supply current intensity is restrained to be not longer than the period of receiving one beacon signal.

Then, during the trial period determined by the timing determining unit 302, the signal generating unit 303 generates a current control signal and outputs the same to the tuner 100 so as to cause the supply current to the circuit component to have the trial value determined by the current intensity changing unit 301 (step S4). In this way, the supply current is tentatively changed as a test.

Subsequently, the current intensity changing unit 301 evaluates the measured MER values output from the waveform equalizing unit 205, during the trial periods t3 to t4, so as to judge whether the trial value of the supply current is proper (S5). For example, the current intensity changing unit 301 compares the average of the measured MER values M1 during the period from t1 to t2 with the measured MER value M2 during the period from t3 to t4, or determines whether M2 falls within the range between the current increase reference value and the current decrease reference value. If the degree of improvement of M2 is larger than that of M1 or M2 falls within the range between the current increase reference and the current decrease reference, it is determined that the trial value is proper. On the other hand, if the degree of improvement of M2 is smaller than that of M1 or when M2 does not fall within the range between the current increase reference value and the current decrease reference value, it is determined that the trial value is improper.

If the current intensity changing unit 301 determines that the trial value is improper (step S5, "trial value improper"), the signal generating unit 303 generates a current control signal instructing to maintain the current intensity as it is and outputs the signal to the tuner 100 (step S9). The process then proceeds to the step S10. In this regard, the alternate long and short dash line after t5 in FIG. 8 indicates the supply current when the trial value is determined to be improper as a result of the test.

On the other hand, if it is determined that the trial value is proper (step S5, "trial value proper"), the current intensity changing unit 301 determines to change the intensity of the supply current to the circuit component and causes the intensity after the change to be equal to the trial value determined in S2 (step S6). Then the timing determining unit 302 determines the timing to change the supply current intensity, based on any one of the aforesaid first to fourth bases (S7). For example, in the case of FIG. 8, according to the second basis or the like, the timing to change the supply current intensity is determined to be equal to the time t5 equivalent to the leading edge of the period of receiving the beacon signal which is a symbol different from the OFDM symbol. The signal generating unit 303 then generates a current control signal and outputs the same to the tuner 100 (step S8), This current control signal instructs to cause the intensity of the supply current to the circuit component to be equal to the value determined by the current intensity changing unit 301, at the timing determined by the timing determining unit 302. The full line after the time t5 in FIG. 8 indicates the supply current in case where the trial value is determined to be proper as a result of the test.

Thereafter, after a predetermined period of time has elapsed in the step S10, the supply current control unit 300 repeats the steps from the step S1.

Figure 9:
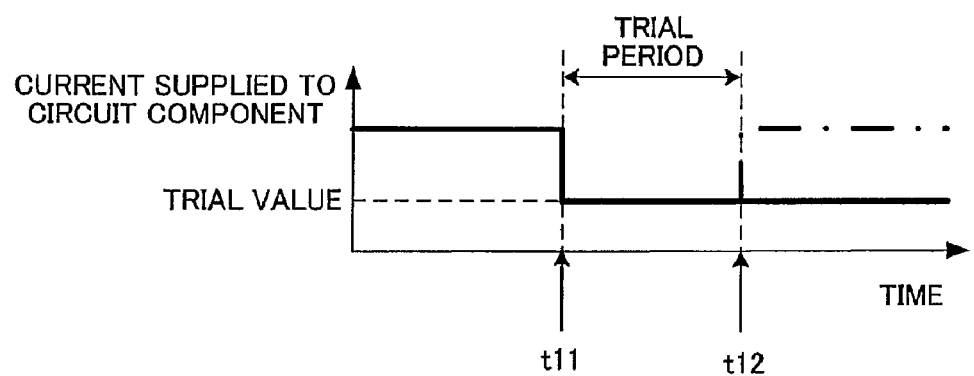
FIG. 9 is a schematic diagram showing the relationship between (i) a graph showing a change in the magnitude of the supply current to the circuit component over time and (ii) a timing at which the tuner receives a signal sequence.

In the example of FIG. 8, the intensity of the supply current to the circuit component before the change to the trial value is temporarily resumed at the time t4 at which the trial period ends. Alternatively, the intensity of the supply current to the circuit component may be maintained at the trial value even after the end of the trial period. For example, as illustrated in FIG. 9, the supply current intensity is decreased to be equal to the trial value as the trial period starts at the time t11. If it is determined by the evaluation of the measured MER values measured during the trial period that the trial value is proper, the intensity of the supply current is maintained at the trial value as shown by the full line of FIG. 9, after the time t12 at which the trial period ends. On the other hand, if the evaluation of the measured MER values measured during the trial period indicates that the trial value is improper, the intensity of the supply current returns, at the time t12, to the value before the trial period as indicated by the alternate long and short dash line of FIG. 9.

As discussed above, in the present embodiment the timing to change the intensity of the supply current to the circuit component is determined according to any one of the first to fourth bases. For example, according to the first or second basis, the intensity of the supply current is changed at the timing to receive a channel other than the target service channel or the timing to receive a signal other than the OFDM symbol. As a result of this, the change in the intensity of the supply current does not easily influence on the signal receiving.

According to the third or fourth basis, if there are different modulation methods or coding rates, the intensity of the supply current is changed at the timing to receive a signal which has a small number of types of modulation reference values or coding rates. In other words, the intensity of the supply current is changed at the timing to receive a signal which can be easily demodulated or whose error can be easily corrected. As a result of this, the change in the intensity of the supply current does not easily influence on the signal receiving.

<Other Variations>

While illustrative and presently preferred embodiments of the present invention have been described in detail herein, it is to be understood that the inventive concepts may be otherwise variously embodied and employed within the scope of the appended claims.

For example, the embodiment above assumes that the intensity of the supply current to the circuit component is changed. This however, does not restrict the scope of the present invention to only current control. The present invention encompasses all arrangements by which an operation parameter of a circuit component is changed. For example, the present invention may be utilized in a case where the power supply to a circuit component is changed by voltage control or in a case where the gain of a circuit control is changed. Also in these cases, the present invention restrains the influence of the change in the operating parameter on the signal.

In addition, in the embodiment above, the supply current is decreased at the start of the trial period. Alternatively, the supply current may be increased at the start of the trial period. This makes it possible to evaluate during the trial period the influence of noise components on a desired component, in the case where the supply current is increased.

In addition, in the embodiment above, the influence of noise components is evaluated based on an MER value measured in the waveform equalizing unit 205. Alternatively, the influence of noise components may be evaluated based on a BER calculated in the error correction unit 206. Furthermore, the influence of noise components may be evaluated by using a method different from both of the calculation of an MER value and the calculation of a BER.

In addition, in the embodiment above, the supply current intensity is changed based on a result of tentative change in the supply current intensity as a test. Alternatively, the operating parameter may be changed without conducting such a test. For example, the tuner 100 is suspended until a target service channel is received, and the tuner 100 is activated only during a period of receiving the target service channel. Specifically, when the target service channel is a channel Ch2 of FIG. 2, the tuner 100 is suspended until the channel Ch1 immediately before the channel Ch2. At around the tailing end of the channel Ch1, the tuner 100 is activated to start receiving the channel Ch2. During the period of receiving the channel Ch2, the supply current is controlled as described in the embodiment above. After the reception of the channel Ch2 ends and the reception of the next channel starts, the tuner 100 is suspended again.

In addition, in the embodiment above, the trial period is arranged to be not longer than a signal beacon signal, in order to minimize the influence of the change in the supply current intensity (see FIG. 8). However, to precisely evaluate the influence of a tentative change in the supply current intensity on a signal, the trial period preferably extends across plural signals constituted by beacon signals and OFDM symbols. For example, when a trial period is arranged to fall within not a single beacon signal but a single control channel, the trial period may be arranged o extend across plural OFDM symbols and beacon signals in that control channel. Also, when a trial period is arranged in a service channel different from a target service channel, the trial period may be arranged to extend across plural OFDM signals and beacon signals in that service channel.

In addition, the embodiment above assumes an apparatus which obtains sound and video from a single target service channel. Alternatively, the present invention may assume an apparatus which receives data from plural service channels. For example, the present invention may be utilized for a server which stores audio data and visual data received from each service channel. In this case these plural service channels are the target channels.

In addition to the above, the present invention may be arranged as in the case of PLC such that, in a channel selection unit performing the channel selection of the present embodiment, the tuner 100 shown in FIG. 2 is constituted either solely by the filter unit 104 or by the filter unit 104 and the amplifier unit 105, and the frequency band limiting of the signal Sr input to the tuner 100 is carried out.

In addition, the embodiment above mainly describes the case where an operating parameter of a circuit component on the tuner 100 side is changed. Alternatively, the present invention may be utilized for changing an operating parameter of a circuit component constituting the ADC unit 201 on the demodulator 200 side.

It is noted that the signal sequence in the present embodiment can be used in any transmission methods in which a desired signal and a signal different from the desired signal are arranged in time series or in which two signals having been subjected to different types of signal processing are arranged in time series. For example, the signal sequence can be used in various communication schemes such as the Chinese digital terrestrial TV standard (GB20600-2006), European digital terrestrial TV standard (DMB-T/H), Power Line Communication, and wireless LAN. In the case of wireless LAN, the present invention can be utilized in an apparatus which exchanges data by wireless, such as a not PC connected to a wireless LAN.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A digital receiver comprising:
plural circuit components including a circuit component which constitutes a receiving unit receiving a signal sequence which is arranged so that first and second signals are lined up in time series, the first signal being modulated by a first modulation method, and the second signal being modulated by a second modulation method in which the number of types of modulation reference values taken by a unit signal is greater than the number of types of modulation reference values for the first modulation method; and
an operating parameter changing unit which changes an operating parameter of at least one of the plural circuit components, during a period in which of the receiving unit receives the first signal.

2. The digital receiver according to any one of claim 1, further comprising:
a noise evaluation unit which evaluates an influence of a noise component on a desired component in a signal received by the receiving unit, wherein,
the operating parameter changing unit changes the operating parameter of the circuit component in accordance with a result of evaluation by the noise evaluation unit.

3. The digital receiver according to claim 2, wherein,
the operating parameter changing unit changes the operating parameter of the circuit component from a first value to a second value, and
the noise evaluation unit compares (i) the influence of the noise component on the desired component in a period in which the operating parameter of the circuit component is at the first value with (ii) the influence of the noise component on the desired component in a period in which the operating parameter of the circuit component is at the second value.

4. The digital receiver according to claim 3, wherein,
after changing the operating parameter of the circuit component to the second value, the operating parameter changing unit temporarily re-changes the operating parameter to the first value, and then changes the operating parameter again based on the result of the evaluation by the noise evaluation unit.

5. The digital receiver according to any one of claim 1, wherein,
the signal sequence is a signal sequence in which plural signals are lined up in time series, and
the operating parameter changing unit changes the operating parameter of the circuit component at a leading end of one of the plural signals.

6. The digital receiver according to any one of claim 1, wherein,
the signal sequence is a signal sequence in which plural signals are lined up in time series, and
if the operating parameter changing unit changes the operating parameter of the circuit component at plural timings, these timings to change the operating parameter fall within a period of receiving one of the plural signals.

7. The digital receiver according to claim 1, wherein,
in the signal sequence, a desired signal and a signal different from the desired signal are lined up in time series, the desired signal indicating desired data which includes at least one of text data, sound data, image data, and a computer program product, and the first signal is the desired signal and the second signal is the signal different from the desired signal.

8. The digital receiver according to claim 7, wherein, the first signal includes an attribute signal which indicates the attribute of the desired signal.

9. The digital receiver according to claim 7, wherein, the first signal includes a synchronization signal which indicates synchronization information used when the desired signal is received.

10. The digital receiver according to any one of claim 1, wherein,
a signal received by the receiving unit is demodulated so that at least one of text data, sound data, image data, and a computer program product is reconstructed.

11. A digital receiver comprising:
plural circuit components including a circuit component which constitutes a receiving unit receiving a signal sequence which is arranged so that first and second signals are lined up in time series, the first signal being encoded with a first coding rate, the second signal being encoded with a second coding rate which is higher than the first coding rate,
an operating parameter changing unit which changes an operating parameter of at least one of the plural circuit components, during a period in which the receiving unit receives the first signal, and
an error correction unit which makes an error correction on the signal sequence by decoding the first signal received by the receiving unit with the first coding rate and decoding the second signal received by the receiving unit with the second coding rate.

12. A control method of a digital receiver, comprising the step of:
changing an operating parameter of at least one of plural circuit components which include a circuit component constituting a receiving unit receiving a signal sequence which is arranged so that a first signal and a second signal are lined up in time series, the first signal being modulated by a first modulation method, and the second signal being modulated by a second modulation method in which the number of types of modulation reference values taken by a unit signal is greater than the number of types of modulation reference values of the first modulation method, the operating parameter being changed during a period in which the receiving unit receives the first signal.

13. A control method of a digital receiver, comprising the step of:
changing an operating parameter of at least one of plural circuit components which include a circuit component constituting a receiving unit receiving a signal sequence which is arranged so that first and second signals are lined up in time series, the first signal being encoded with a first coding rate, the second signal being encoded with a second coding rate which is higher than the first coding rate, the operating parameter being changed during a period in which the receiving unit receives the first signal, and
making an error correction on the signal sequence by decoding the first signal received by the receiving unit with the first coding rate and decoding the second signal received by the receiving unit with the second coding rate.

14. A non-transitory computer-readable recording medium recording thereon a computer program product causing a digital receiver, which includes plural circuit components including a circuit component constituting a receiving unit receiving a signal sequence which is arranged so that a first signal and a second signal are lined up in time series, to change an operating parameter of one of the plural circuit components during a period in which the receiving unit receives the first signal, the first signal being modulated by a first modulation method, and the second signal being modulated by a second modulation method in which the number of types of modulation reference values taken by a signal unit is greater than the number of types of modulation reference values of the first modulation method.

15. A non-transitory computer-readable recording medium recording thereon a computer program product causing a digital receiver, which includes plural circuit components including a circuit component constituting a receiving unit receiving a signal sequence which is arranged so that first and second signals are lined up in time series, to change an operating parameter of at least one of the plural circuit components, during a period in which the receiving unit receives the first signal, the first signal being encoded with a first coding rate, the second signal being encoded with a second coding rate which is higher than the first coding rate, and
causing the digital receiver to make an error correction on the signal sequence by decoding the first signal received by the receiving unit with the first coding rate and decoding the second signal received by the receiving unit with the second coding rate.

16. A digital receiver comprising:
plural circuit components including a circuit component which constitutes a receiving unit receiving a signal sequence with is arranged so that first and second signals are lined up in time series, the first signal being encoded with a first coding rate, the second signal being encoded with a second coding rate which is higher than the first coding rate;
a timing information obtaining unit which obtains timing information for determining a timing to receive the first signal and a timing to receive the second signal;
a timing determining unit which determines a timing to change an operating parameter of at least one of the plural circuit components based on the timing information obtained by the timing information obtaining unit so that the timing to change the operating parameter falls within a period in which the first signal is received; and
an operating parameter changing unit which changes the operating parameter at the timing determined by the timing determining unit.

17. A control method of a digital receiver, including a receiving unit receiving a signal sequence which is arranged so that first and second signals are lined up in time series, the first signal being encoded with a first coding rate, the second signal being encoded with a second coding rate which is higher than the first coding rate, the method comprising:

a timing information obtaining step of obtaining timing information for determining a timing to receive the first signal and a timing to receive the second signal;

a timing determining step of determining a timing to change an operating parameter of at least one of plural circuit components which include a circuit component constituting the receiving unit, based on the timing information obtained in the timing information obtaining step so that the timing to change operating parameter falls within a period in which the first signal is received; and an operating parameter changing step of changing the operating parameter at the timing determined in the timing determining step.

18. A non-transitory computer-readable recording medium recording thereon a computer program product causing a digital receiver to change an operating parameter of at least one of plural circuit components including a circuit component constituting a receiving unit receiving a signal sequence which is arranged so that first and second signals are lined up in time series, the first signal being encoded with a first coding rate, the second signal being encoded with a second coding rate which is higher than the first coding rate, the computer program product further causing the digital receiver to execute:

a timing information obtaining step of obtaining timing information for determining a timing to receive the first signal and a timing to receive the second signal;

a timing determining step of determining a timing to change the operating parameter base on the timing information obtained in the timing information obtaining step so that the timing to change the operating parameter falls within a period in which the first signal is received; and an operating parameter changing step of changing the operating parameter at the timing determined in the timing determining step.

* * * * *